Figure 1:
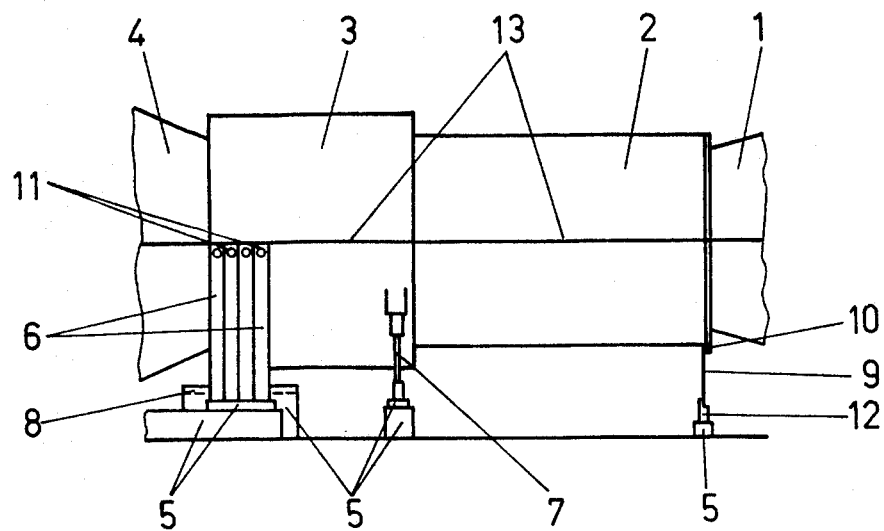

United States Patent [19]

Eggmann et al.

[11] 4,050,660
[45] Sept. 27, 1977

[54] CASING SUPPORT FOR HORIZONTAL-AXIS CASINGS EXPANDING IN OPERATION

[75] Inventors: Jean Eggmann; Max Hartmann, both of Baden, Switzerland

[73] Assignee: BBC Brown Boveri & Company Limited, Baden, Switzerland

[21] Appl. No.: 692,235

[22] Filed: June 2, 1976

[30] Foreign Application Priority Data

July 2, 1975 Switzerland .................. 8576/75

[51] Int. Cl.² ........................................ B63B 25/14
[52] U.S. Cl. ............................ 248/19; 248/DIG. 1; 415/219 R; 417/572
[58] Field of Search ................. 248/19, DIG. 1; 415/134, 135, 138, 219 R; 417/572

[56] References Cited

U.S. PATENT DOCUMENTS

| | | | |
|---|---|---|---|
| 1,362,401 | 12/1920 | Doran | 415/134 X |
| 2,464,356 | 3/1949 | Stearns | 248/DIG. 1 X |
| 2,524,693 | 10/1950 | Bryant | 415/219 R UX |
| 2,643,078 | 6/1953 | Brown et al. | 248/DIG. 1 X |
| 3,313,517 | 4/1967 | Hanschke et al. | 415/134 X |
| 3,369,783 | 2/1968 | Keating | 248/19 |
| 3,556,672 | 1/1971 | Gentile | 415/134 |
| 3,829,234 | 8/1974 | Benz | 248/DIG. 1 X |
| 3,841,269 | 10/1974 | Urruela | 248/DIG. 1 X |
| 3,843,281 | 10/1974 | Meylan | 415/219 R |
| 3,881,843 | 5/1975 | Meylan | 415/219 R |

*Primary Examiner*—J. Franklin Foss
*Attorney, Agent, or Firm*—Pierce, Scheffler & Parker

[57] ABSTRACT

A composite support structure for the casing of a rotary machine comprising coupled turbine and compressor units includes a pair of non-articulated multiple bar type pendulum supports upstanding on a support base at opposite sides of and secured to the casing. The load imposed by the casing on the pendulum supports is relieved by a system of vertical adjustable sprung supports extending between the casing and support base, and a pin projecting downwardly from the casing in alignment with a vertical plane through the machine axis is secured to a horizontally positioned flexible membrane which likewise is secured to the support base for securing the casing against movement in any and all directions in a horizontal plane but permitting expansion in a vertical direction. A transverse metallic sheet either slotted or provided with cut-outs is secured between the underside of the casing and support base and accommodates torsion and/or axial expansion of the casing.

19 Claims, 3 Drawing Figures

CASING SUPPORT FOR HORIZONTAL-AXIS CASINGS EXPANDING IN OPERATION

This invention relates to an improved structure for supporting the casings of horizontal axis rotary machines on their foundations and which are subject to thermally induced expansion during their operation. The invention has particular application to the casings of turbo-machines and wherein the casings are divided horizontally into upper and lower halves joined together along the division plane by means of a bolted flanged connection.

Machine casings which expand during operation as a result of heat must be fixed to the foundation in such a way that the foundation and casing do not exert stresses on each other. The casings of turbo-machines in particular attain fairly high temperatures in operation and are supported as close as possible to, or exactly at, the horizontal joint between the upper and lower casing halves in order to prevent vertical displacement of the machine axis due to thermal expansion. Articulated supporting elements are often used which allow axial expansion of the casing. Such an articulated support is illustrated, for example, in the brochure "Heavy-duty gas turbines," John Brown — General Electric, March 1966. The disadvantage of these articulatd supports, which are used in conjunction with nonarticulated supports located in the cold part of the casing, lies particularly in the fact that they are not clearance-free, and owing to the friction present can lead to stick-slip effects. Supporting elements in the form of plates, or sheets arranged in the radial plane are also known (see for example "Saturn Gas Turbine Installations," Solar, Calif., undated). These plates or sheets, however, are not torsionally flexible and so do not allow the casing to twist, which especially in the case of gas turbines, the compressor and turbine blading of which generate torques acting in opposite directions, results in additional loading on the supports. In order to secure the position of the machine axis a fixed point is provided beneath the casing which locates the casing in the axial and horizontal/radial directions. The form of the fixed point known hitherto consists of a vertical pin which is fixed to the casing and guided in the vertical direction by means of a sleeve mounted on the foundation. This construction is shown in the brochure "Gas Turbines," Siemens-Turbotech. Inc., USA 1969, page 6. The disadvantage of this arrangement is that in view of differing thermal expansion a clearance must be present, and jamming can occur if the axes of the pin and sleeve are inclined to one another.

It is the particular object of the invention to create a casing support for horizontal-axis machine casings expanding in operation, in particular for turbo-machine casings, which holds the casing in the required position and accommodates the forces and moments acting on it. Displacement occurring due to thermal expansion is to be absorbed solely through elastic deformation so as to avoid friction forces which are difficult to monitor. The support must at the same time allow equalisation of opposed torques of turbine and compressor rotors in the cylindrical housing such that only the residual torque is transmitted to the foundation via the support. The means of attaching the supports to the machine must cause as little deformation of the casing as possible.

This objective is achieved in that the casing support is formed by two non-articulated elastic pendulum type supports, the load on which is preferably relieved by sprung supports, by a preferably multiple-layer membrane located between the elastic supports, joined to the casing by means of a pin and allowing vertical movement of the casing but securing the casing against movement in any and all directions in a horizontal plane, and by a metal sheet or sheet assembly structure located in a radial plane of the casing and permitting torsion and/or axial expansion of the casing.

The advantage of the invention is particularly that this casing support well secures the desired position of the casing when it expands during operation, because all the support elements are without articulation, and hence without clearance, and all displacement occurring as a result of thermal expansion can be accommodated by elastic deformation. Arranging the supporting sheet or sheet assembly in a radial plane of the casing enables torsional deformation to be absorbed.

It is of particular advantage if the two non-articulated elastic pendulum type supports, two sprung supports and a membrane attached to the casing by means of the pin are located at least essentially in the same radial plane of the casing such that the membrane is located in a vertical plane of the casing through the axis and the elastic pendulum type supports and the sprung supports support the casing symmetrically to the membrane. This arrangement ensures that the position of this radial plane of the casing does not move, the pin joining the membrane and the casing forming the fixed point, the elastic pendulum type supports allowing radial expansion and the sprung supports relieving the load on the elastic pendulum type supports.

It is recommended that the elastic pendulum type supports should comprise at least two flat bars standing next to each other. The elastic supports are divided into individual bars so that the differential expansion between the foundation and the part of the casing joined to the upper portion of the elastic support can be accommodated without great forces and stresses. It is also of benefit if the upper portions of the elastic supports are fixed to the casing below the horizontal joining plane of the two halves of the casing. This arrangement enables the upper half of the casing to be removed, for example, without difficulty and prevents vertical displacement of the casing axis, because during thermal expansion the upper portion of the elastic support moves in the direction of the casing radius. It is of particular advantage if the upper portions of the elastic supports are joined to the casing by way of shear bushes. The advantage of this arrangement lies particularly in the fact that the bush serves as thermal insulation, which can be further increased through a suitable choice of material, and that the lever arm is short. In a preferred configuration the elastic supports support the casing at its hot part. This arrangement is made possible by the vertical division of the elastic supports and widens the range of design alternatives as regards choice of number and distribution of the support elements.

It is of advantage if the sprung supports incorporate springs with a flat spring characteristic. The advantage of this arrangement is that the supporting forces vary only little during expansion. It is also beneficial if the sprung supports have adjustable end-stops contained in their bases to limit the spring travel. This is particularly important when the weight alters if the upper half of the turbine casing is removed. It is convenient if the bases of the sprung supports incorporate holes for measuring the spring travels. It is also of benefit if the sprung supports contain means for adjusting the initial spring tension. This arrangement allows the spring force to be adapted quickly. It is further of advantage if the casing support includes at least two, and preferably four or more sprung supports. Two sprung supports relieve the load on the elastic supports, and another two can support a further portion of the casing. In an alternative configuration the distribution of the sprung supports, in particular in the radial direction of the casing, is so chosen that deformation of the casing is minimal. This distribution of the sprung supports at predetermined points prevents extensive flattening in the horizontal or vertical direction.

In another alternative configuration the membrane, which is joined to the casing by means of the pin and allows expansion of the casing by movement of the pin and membrane, is of such a form that it also accommodates small deviations of the pin from the vertical. This ensures that this component functions correctly even if the pin or the part of the casing carrying the pin suffer slight deformation.

In a further alternative configuration the metal sheet or sheet assembly located in the radial plane of the casing and allowing torsion and/or axial expansion of the casing is provided with preferably radial slots or cutouts. The advantage of this arrangement is particularly that the torsional elasticity is increased and the sheet or sheet assembly permits sufficient torsion of the part of the casing supported on it. It is of particular advantage if the lower part of the sheet or sheet assembly is joined to the lower parts of two pendulum sheets which are arranged on either side and suspended directly or indirectly on the foundation, preferably by way of stiff plates. With this arrangement the functions of accommodating axial expansion and torsion are divided between two separate elements. The sheet or sheet assembly, preferably provided with radial cutouts, absorbs torsional deformation and the pendulum sheets take up axial expansion. The pendulum sheets transmit the supporting forces through tension, and no account need be taken of buckling.

Figures 2, 3:
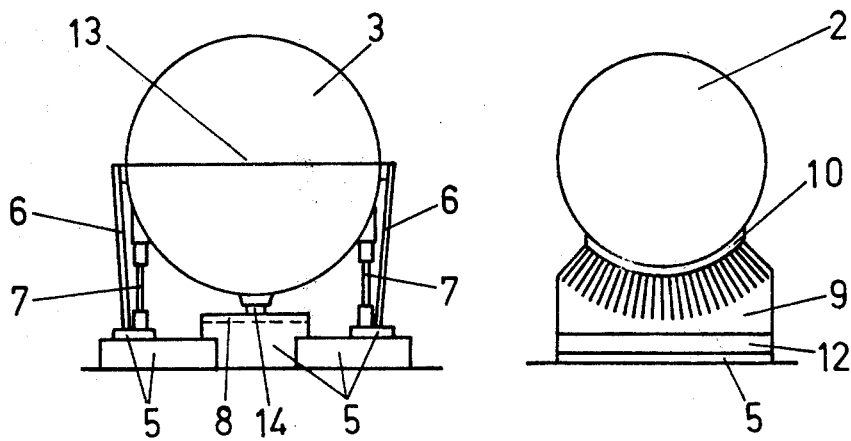
Figure 4:
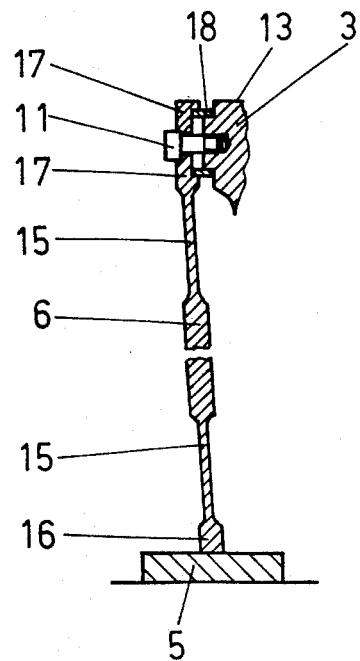
Figure 5:
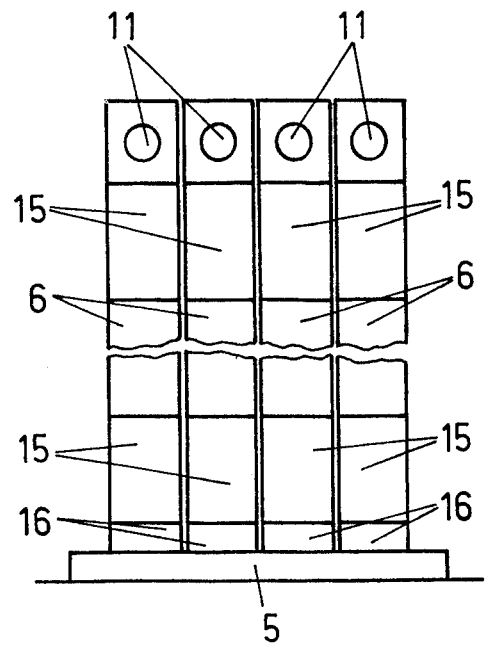
Figure 6:
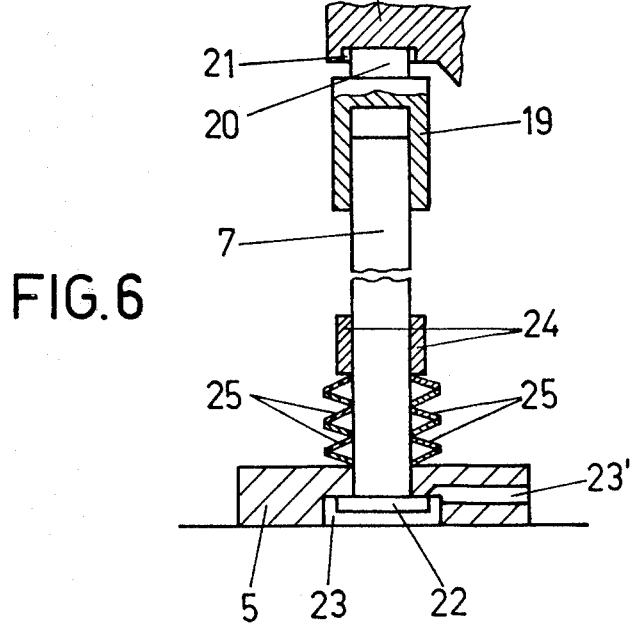
Figure 7:
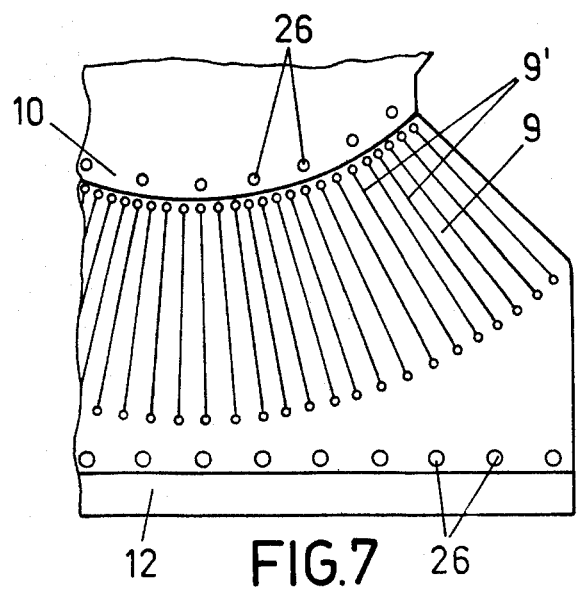
Figure 8:
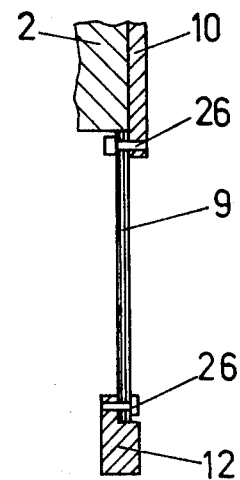
Figure 9:
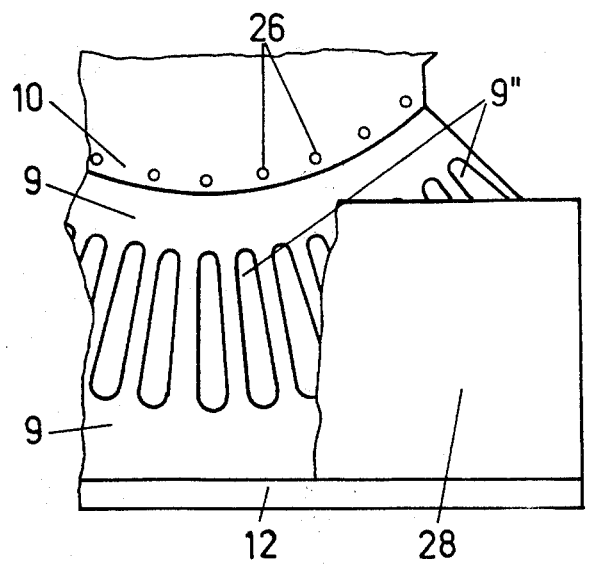
Figure 10:
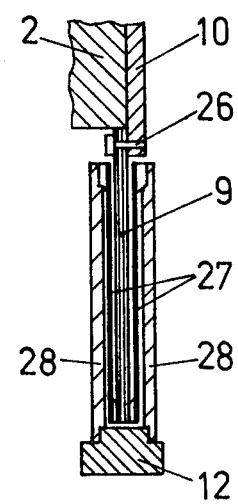
Figure 11:
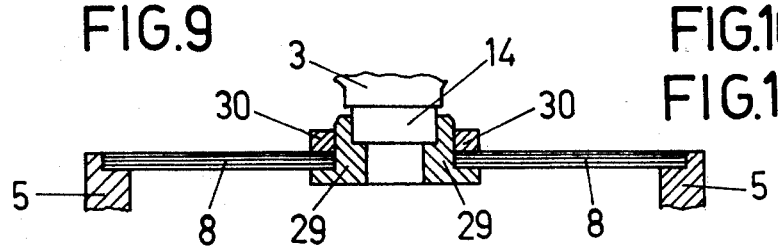

Preferred embodiments of the invention will not be described and are illustrated in the accompanying drawings, in which:

FIG. 1 shows schematically in side elevation a turbomachine casing with an arrangement of a casing support according to the invention, FIG. 2 is a transverse view of the casing support at the left-hand part of FIG. 1, FIG. 3 is a transverse view of the casing support at the right-hand part of FIG. 1, FIG. 4 is a longitudinal section through one embodiment of an elastic support element, as shown in FIG. 1, FIG. 5 is a front view of the elastic support element shown in FIG. 4, FIG. 6 is a longitudinal section through one embodiment of a sprung support element, as shown in FIG. 1, FIG. 7 is an end view of one embodiment of a sheet metal assembly support element, as shown in FIG. 1 permitting torsion and/or axial expansion of the machine casing, FIG. 8 is a vertical section through the sheet metal assembly support shown in FIG. 7, FIG. 9 is an end view of a second embodiment of the sheet metal assembly support, FIG. 10 is a vertical cross section through the embodiment of the sheet metal support assembly shown in FIG. 9, and FIG. 11 is a section through one embodiment of a membrane support element located between the two elastic supports beneath the lower half of the casing and associated with the pin which depends from it.

By way of a general introduction to the more detailed description to follow, FIG. 1 shows an intake branch 1, a compressor casing 2, a turbine casing 3, and exhaust diffusor 4, bases 5 of the support elements, a four-part elastic pendulum support 6, a sprung support 7, a multiple-layer membrane 8, a sheet assembly 9, a flange 10 of the compressor casing 2, bolts 11 for fixing the pendulum support 6, a foundation beam 12 for the sheet assembly 9, and the horizontal division plane 13 of casings 2 and 3. Identical parts in all the figures are identified by the same reference numbers. A pin in FIG. 2 is denoted 14. FIG. 4 shows reduced portions 15 of the pendulum support 6, the lower portions 16 of the pendulum support 6 and the upper portions 17 of this support. A shear bush is denoted 18. FIG. 6 illustrates a screw nut 19 of sprung support 7, a pin 20, a recess 21 in the turbine casing 3, an adjustable end-stop 22, a recess 23 in base 5, a hole 23' for measuring the spring travel, an adjusting nut 24 and dished springs 25. In FIG. 7 the number 9' denotes slots in sheet assembly 9. Screw bolts for fixing the sheet assembly 9 have the number 26. FIG. 9 shows cutouts 9'' in sheet assembly 9, and plates 28. Flexible sheets 27 can be seen only in FIG. 10. In FIG. 11 a flange has the number 29, and a fixing ring the number 30.

A gas turbine is shown schematically in FIG. 1. The turbine casing 3 is supported by two four-part elastic pendulum type supports 6 located at opposite sides respectively of the casing and four sprung supports 7. In FIG. 1 only one sprung support 7 can be seen; the other is located behind this and on the opposite side, and two further sprung supports 7 stand behind the elastic pendulum support 6. This arrangement can be seen clearly in FIG. 2. The fixed point is formed by multiple-layer membrane 8, which is joined to the bottom half of the turbine casing 3 by means of pin 14. The compressor casing 2 is supported by sheet assembly 9 which at its top part is joined to flange 10 located on the inlet end of the compressor casing, and at its bottom part to foundation beam 12. In the embodiment of the sheet assembly 9 shown in FIG. 3, the upper portion is in the form of segments. The sheet assembly 9 together with the pendulum supports 6 fix the horizontal position of the machine axis. The membrane 8 and the sheet assembly 9 at the inlet end of the compressor casing 2 prevent any asymmetrical flexure of the pendulum supports 6. The sheet assembly 9 also absorbs torsion of the casing. The sheet assembly 9 is so constructed that it is torsionally elastic about the machine axis and allows a rotational displacement of the flange 10 to which it is attached. It thus offers only slight resistance to rotational displacement of the compressor casing 2, and so the compressor torque acts contra to the turbine torque. A residual torque acts outwards via the pendulum supports 6. This comprises in the main the difference between turbine and compressor torques, with a smaller part consisting of the torque occurring due to elastic deformation of the sheet assembly 9 as the compressor casing 2 turns. The sprung supports 7 carry a large part of the weight of the machine which would otherwise have to be borne by the pendulum supports 6 alone.

FIGS. 4 and 5 show one embodiment of the pendulum support 6. Two thinner portions 15 of the support are provided in the bending direction and immediately next to the points or attachment at the end portions 16 and 17 and reduce the stresses caused by bending. These thinner portions 15 reduce only slightly the necessary stiffness of the pendulum supports 6 in the longitudinal direction. The lower end portion 16 of the pendulum support 6 is firmly joined, e.g., welded, to the foundation 5. The upper end portion 17 is fixed to the turbine casing 3 below the horizontal division plane 13 with screw bolts 11 via shear bush 18. The centering of the shear bushes 18 is such that the temperature drop from turbine casing 3 to the pendulum support 6 cannot give to any clearance. The inner diameter of the shear bush 18 fits over a cylindrical projection on the turbine casing 3, while its outer diameter fits into a cylindrical recess in the upper end 17 of the pendulum support 6. The bolts 11 clamp the shear bushes 18 between the upper part 17 of the pendulum support 6 and the turbine casing 3. The bolt tension is so designed that the clamping force prevents the shear bush 18 from lifting off even when the maximum torque occurs. Heating of the pendulum support 6 is reduced by selecting a material having a low thermal conductivity coefficient and/or small cross-section for the shear bush. To facilitate machining of the necessary points of attachment the shear bush 18 is placed against the turbine casing 3 with its axis horizontal, and any angular variation is compensated by suitably inclining the recess bored in to the pendulum support 6. Through a division of each pendulum support 6 vertically into a number of parts e.g., the four bars illustrated, it is possible to fix the pendulum supports 6 to the hot part of the turbine casing 3.

As shown in FIG. 6, the sprung support 7 in the form of a round rod is provided at the top with a screw nut 19 with which the sprung travel is adjusted. The initial tension of the spring is set with adjusting nut 24. Both nuts 19 and 24 can be secured with other nuts (not shown), for example. The nut 19 has a pin type projection 20 which supports the turbine casing 3 and fits into a recess 21 in the latter. The adjustable end-stop 22 in the recess 23 in base 5 limits the spring travel so that the dished springs 25 which surround the rod 7 between nut 24 and foundation 5 do not distort the division plane 13 of the casing upwards when the machine is opened i.e., when the upper half of the casing is removed. The spring travel can be measured through the hole 23'.

FIGS. 7 and 8 show one embodiment of the sheet assembly 9. The surface plane of the sheet assembly 9 stands perpendicular to the machine axis. The advantage of a packet of thin sheets over a single plate is that multiple sheets can accommodate greater bending without unacceptable forces and stresses. The thickness of the individual sheets is so chosen that the maximum permissible bending stress is not exceeded. The number of sheets is determined by the maximum permissible compressive load, in which case the required resistance to buckling is also observed. The optimum arrangement is obtained when, at specified conditions, the sheets are so set that no deformation occurs when they are halfway through their travel. In the example shown, the sheet packet or assembly 9 is joined to a lower 90° sector of the vertical flange 10 of the compressor casing 2 with screw bolts 26 and, if appropriate, also via shear bushes (not shown). The lower part of the sheet assembly 9 is fixed to the horizontal foundation beam 12 located at right angles to the machine axis. Torsional elasticity is obtained by means of individual slots 9' which extend radially of the machine axis. The slots 9' begin immediately adjacent the points of bolting to the flange 10. The length and number of slots 9' is so chosen that the deforming stress and forces are as small as possible. FIGS. 9 and 10 show an alternative embodiment of the sheet assembly 9 in which the functions of accommodating axial expansion and torsion are divided among two separate components. The sheet assembly 9 (which can also be in the form of a single sheet), with radial cutouts 9'' between which relatively thin webs remain, absorbs torsional deformation, and axial expansions is accommodated by two pendulum sheets 27 located on either side of the sheet assembly 9. Since the sheet assembly 9 does not have to absorb any bending deformation, its thickness can be so chosen that the cross-section of the webs between the cutouts 9'' provides the necessary resistance to buckling. The pendulum sheets 27 transmit the supporting forces only by tension. Their buckling strength need therefore not be considered and the cross-section of the pendulum sheets 27 can be comparatively small. The pendulum sheets 27 are supported on the foundation beam 12 by two plats 28 or two thick sheets located outside the two pendulum sheets 27. These plates 28 are loaded only in compression.

The multiple-layer circular membrane 8 also consisting of a packet of sheets is illustrated in FIG. 11. The peripheral portion of the membrane is joined to a cylindrical part of foundation 5 with bolts (not shown). The membrane 8 is provided with a central bore and its inner diameter is fitted onto an intermediate flanged hub part 29 to which it is joined via fixing ring 30 with bolts (not shown). The connection between intermediate hub part 29 and turbine casing 3 is in the form of a pin 14 depending from the lower half of casing 3. The membrane 8 holds the turbine casing 3 firmly in all directions in the horizontal plane, but allows the relevant part of the casing to move vertically relative to the foundation or baseplate. The membrane 8 can also be of such dimensions that it functions as an articulated support and accommodates small deviations of pin 14 from the vertical.

The subject of the invention is of course not restricted to specifically what is shown in the drawings. The respective constructions of the three principal casing supporting components, namely, the pendulum support 6, the sprung support 7, and the multiple-layer membrane 8 may be varied and the principles of the invention can also be applied to other horizontal-axis housings which expand during operation, e.g., the housings of electrical machines.

We claim:

1. A composite support structure for and connected with the casing of a rotary machine operating on a horizontal axis which comprises a pair of vertically extending non-articulated pendulum supports located at opposite sides of said casing, the lower ends of said pendulum supports being secured to a support base and the upper ends to said casing, vertically extending sprung supports also located at opposite sides of said casing for relieving the load imposed by the machine on said pendulum supports, the lower ends of said sprung supports being secured to said support base and the upper ends to said casing, a flexible membrane mounted on said support base and extending horizontally between said pendulum supports beneath said casing, a pin depending from the bottom of said casing in a vertical plane through the axis of said casing and which is secured to said membrane, said pin and membrane acting conjointly to secure said casing against movement in all directions in a horizontal plane but permitting expansion of said casing in a vertical direction relative to said support base, and a metallic sheet structure disposed in a radial plane of said casing and located beneath said casing, the upper end of said metallic sheet structure being secured to the under part of said casing and the lower end being secured to said support base for permitting torsion and/or axial expansion of said casing.

2. A support structure for the casing of a rotary machine as defined in claim 1 wherein said pendulum supports, said sprung supports and said membrane are located in at least essentially the same radial plane of said casing such that said membrane lies in the vertical axial plane of said casing, and said pendulum supports and sprung supports serve to support said casing symmetrically to said membrane.

3. A support structure for the casing of a rotary machine as defined in claim 1 where each of said pendulum supports comprises at least two flat bars standing next to each other.

4. A support structure for the casing of a rotary machine as defined in claim 1 wherein the upper ends of said pendulum supports are secured to said casing by means including shear bushes.

5. A support structure for the casing of a rotary machine as defined in claim 1 wherein said casing includes a hot portion and wherein said pendulum supports are secured to said hot portion.

6. A support structure for the casing of a rotary machine as defined in claim 1 wherein said sprung supports incorporate spring elements having a flat spring characteristic.

7. A support structure for the casing of a rotary machine as defined in claim 1 wherein said sprung supports incorporate adjustable end-stops at the base portions thereof to limit spring travel.

8. A support structure for the casing of a rotary machine as defined in claim 7 wherein said sprung supports incorporate means for measuring the spring travel.

9. A support structure for the casing of a rotary machine as defined in claim 1 wherein said sprung supports incorporate means for adjusting the initial spring tension.

10. A support structure for the casing of a rotary machine as defined in claim 1 wherein at least a pair of axially spaced sprung supports are provided along each side of said casing.

11. A support structure for the casing of a rotary machine as defined in claim 10 wherein the distribution of said sprung supports as related to the radial direction of said casing is such that said casing is subjected to minimum deformation.

12. A support structure for the casing of a rotary machine as defined in claim 1 wherein said membrane is constructed in such manner as to accommodate small deviations from the vertical of pin movement.

13. A support structure for the casing of a rotary machine as defined in claim 1 wherein said metallic sheet structure is provided with slots.

14. A support structure for the casing of a rotary machine as defined in claim 13 wherein the said slots in said metallic sheet structure extend in a radial direction from the machine axis.

15. A support structure for the casing of a rotary machine as defined in claim 1 wherein said metallic sheet structure is provided with cut-outs.

16. A support structure for the casing of a rotary machine as defined in claim 15 wherein the said cut-outs in said metallic sheet structure extend in a radial direction from the machine axis.

17. A support structure for the casing of a rotary machine as defined in claim 1 wherein the lower end of said metallic sheet structure is joined to the lower ends of two resilient sheets located at opposite sides of the sheet structure, and the upper ends of said resilient sheets are joined to the upper ends of two stiff plates, the lower ends of said stiff plates being secured to said base.

18. A support structure for the casing of a rotary machine as defined in claim 1 wherein the machine is constituted by a turbine shaft-coupled to a compressor, said pendulum and sprung supports being secured to that part of the machine casing which encloses the turbine and said metallic sheet assembly being secured to that part of the machine casing which encloses the compressor.

19. A support structure for the casing of a rotary machine as defined in claim 1 wherein each said sprung support comprises a vertically extending rod provided at its upper end with a screw nut for adjustment of the spring travel, dished springs surrounding said rod, the lower ends of said dished springs being engaged with the support base and the upper ends thereof with a tension adjusting nut threaded onto said rod, and an adjustable end-stop on the lower end of said rod for limiting upward travel of said rod.

* * * * *